Sept. 27, 1966   D. C. CHASE   3,274,645
EXTRUDER-ROLLER DIE
Filed Nov. 20, 1963   2 Sheets-Sheet 1
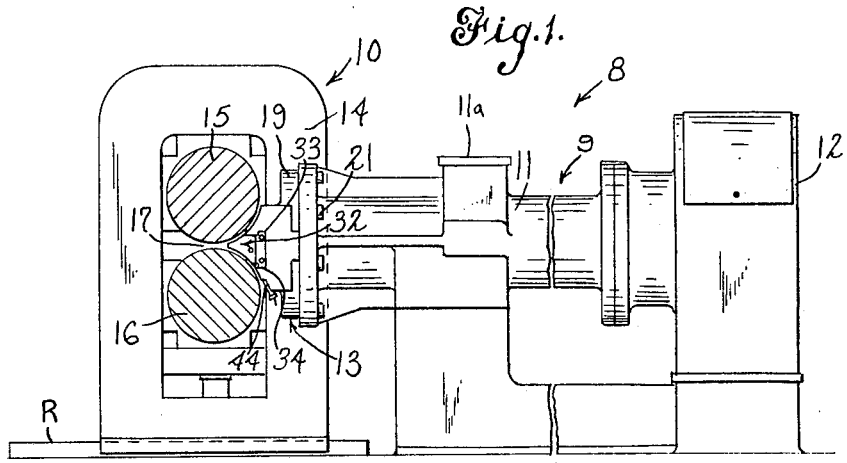
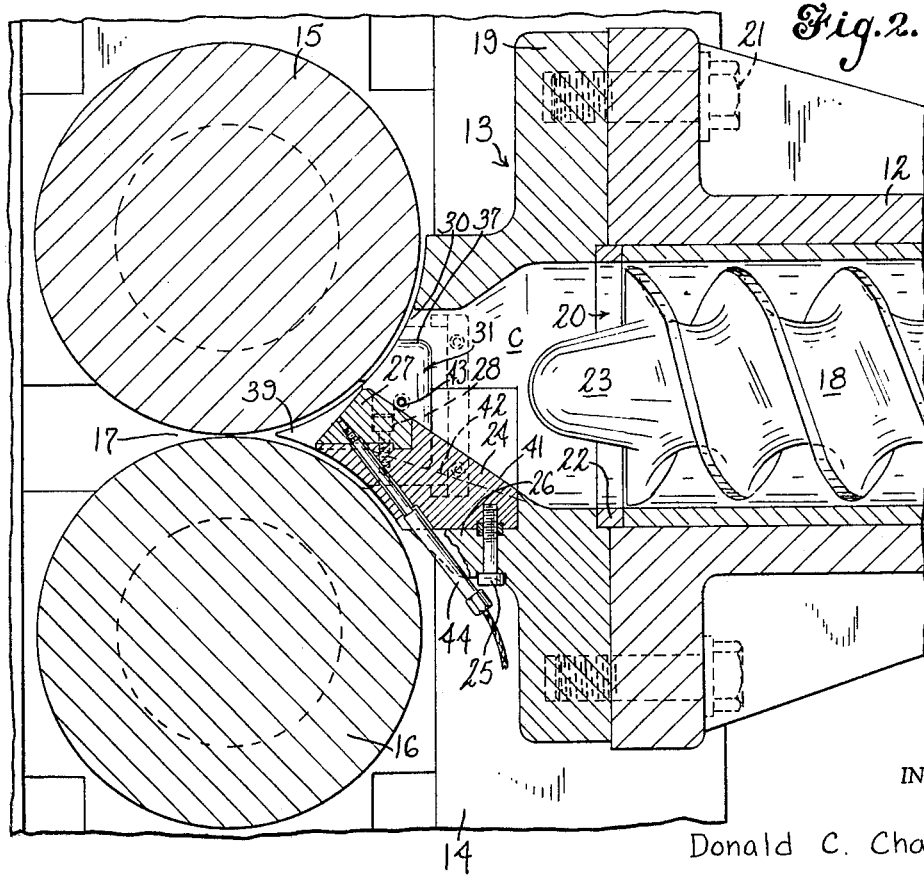
INVENTOR
Donald C. Chase
BY
Rockwell and DeLio
ATTORNEYS Sept. 27, 1966     D. C. CHASE     3,274,645
EXTRUDER-ROLLER DIE
Filed Nov. 20, 1963     2 Sheets-Sheet 2

INVENTOR
Donald C. Chase
BY
Rockwell and DeLio
ATTORNEYS

United States Patent Office 3,274,645
Patented Sept. 27, 1966

3,274,645
EXTRUDER-ROLLER DIE
Donald C. Chase, Milford, Conn., assignor to Farrel
Corporation, Ansonia, Conn.
Filed Nov. 20, 1963, Ser. No. 324,973
8 Claims. (Cl. 18—12)

This invention relates to an extruder-calendering apparatus and more particularly relates to an extruder-roller die for semifluid material such as plastic, rubber and the like.

As will be hereinafter more fully described, apparatus for extruding and rolling films and sheetings of material may comprise an extruding cylinder where the material is carried through a mixer or extruder and cooperating calender rolls. The material, after being deposited in a hopper, is treated and then forced through the extruder which spreads and discharges the material in a plastic state onto the calender rolls which calenders the material into a web or sheet under heavy pressure. In this arrangement the calender rolls define a die orifice.

In many apparatus and operations for extruding material in a plastic state an extruding die is provided having a nozzle with a rectangular opening which is dimensioned in a direct relation to the ultimate dimension of the product being produced. However, in extruder-calendering apparatus wherein material in plastic form is partially formed by an extruder die which deposits the material on the calender rolls and where the width of the material being processed by the rolls is substantially wider than the width of the inlet orifice of the extruder-die, a critical problem is presented in attempting to present the material to the calender rolls in a uniform condition along a portion of the length thereof such that the rolls can produce a sheet of material with uniform and satisfactory characteristics.

Where the material to be rolled is introduced into the inlet orifice of the extruder die of one width and exits through a discharge orifice of a larger width, it is readily apparent that the material must spread laterally along the width of the extruder die cavity as it passes through the extruder die. However, viscous materials will resist lateral spreading and it becomes necessary to provide a means for bringing the material to the discharge orifice of the extruder die in a uniform condition so that it will extrude through the discharge orifice in an acceptable condition for uniform calendering.

Accordingly, an object of this invention is to provide a new and improved extruder-roller die of the type described wherein material in a plastic state is delivered to the calender rolls at an essentially uniform temperature and viscosity and proper thickness.

Another object of this invention is to provide a new and improved extruder of the type described wherein material in a plastic state, issued into the extruder through an inlet orifice and passed therethrough to a discharge orifice of substantially greater width, has lateral directional components imparted thereto which spread the material across the discharge orifice with substantially uniform characteristics.

A further object of this invention is to provide a new and improved extruder-roller die of the type described wherein the extruder die may be varied in contour to compensate for the viscosity of the material being processed.

Briefly stated, the invention, in one form thereof, comprises the provision of an extruder-roller die wherein the extruder is so shaped and contoured that material introduced therein is so controlled and so directed that upon passing through the discharge orifice of the extruder die, it reaches the calender roll orifice at a substantially uniform temperature and viscosity across the width thereof.

The features of the invention which are believed to be novel are pointed out with particularity in the claims appended to and forming part of this specification. However, the invention itself, both as to its operation and organization, together with further objects and advantages thereof, may best be appreciated by reference to the following detailed description taken in conjunction with the drawings wherein:

FIG. 1 is a side elevation, partially in section, of an extruder-roller die embodying the invention;

FIG. 2 is a fragmentary and enlarged view, similar to FIG. 1, of the extruder and calender rolls;

Figure 3:
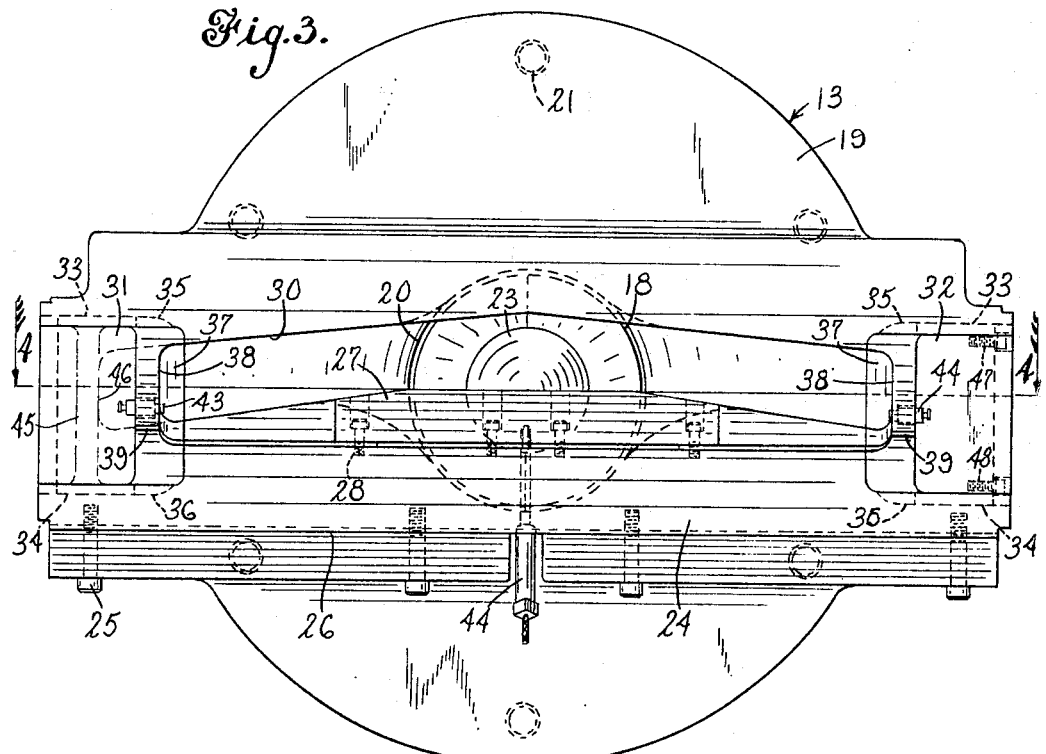
FIG. 3 is a front elevation of the extruder of FIG. 1, showing the outlet orifice thereof.

To illustrate a preferred embodiment of the invention, an extruder-roller die generally indicated by the reference numeral 8 is shown. The extruder-roller die generally comprises an extruder portion 9 and a roller die 10. For reasons hereinafter explained the calender comprising roller die 10 may be mounted on rails R for movement toward and away from the extruder portion. Extruder portion 9 comprises an extruder or feed screw housing 11 defining a receptacle 11a adapted to receive material in a plastic or viscous state or produce such a state. A drive mechanism for the screw is enclosed in housing 12.

Materials deposited in receptacle 11a is transferred through housing 11 to an extruder die 13 where it is delivered to a roller die, calender 14, comprising calender rolls 15 and 16. The rolls 15 and 16 define an opening or orifice 17 therebetween which determines the final cross-section of material issuing from the apparatus. The rolls 15 and 16 and orifice 17 effectively define a roller die.

Material from receptacle 11a is conveyed to extruder die 13 by means of a feed screw 18 which upon rotation thereof mixes and/or advances the material in a plastic state. Extruder die 13 comprises an extruder head 19 defining an inlet orifice 20. Extruder head 13 is secured to the feed conduit and the inlet orifice is aligned therewith and secured to housing 12 by means of a plurality of bolts 21. A suitable sealing means 22 is provided to seal the joint between the housing 12 and the extruder head 19 and the nose 23 of the screw 18 extends into the cavity C defined by the extruder head.

Mounted on the extruder head 19 and comprising a portion thereof is a lower die portion 24 affixed thereto by a plurality of bolts 25 passing through ledges 26 on extruder head 19. Lower die portion 24 defines a recess centrally therein, as more clearly shown in FIGS. 3 and 4, which is adapted to have removably mounted therein a die lip member 27. Lip member 27 is secured in the recess defined by die portion 24 by a plurality of recessed bolts 28 extending therethrough and threadably received in die portion 24. Extruder head 19, together with lower die portion 24 and lip 27, define a discharge orifice 30 of generally elongated, shallow, V-shape. The discharge orifice is defined at the ends thereof by die side members 31 and 32. Each of die side members 31 and 32 have upper and lower tongues 33 and 34, respectively, which are removably insertable into slots 35 and 36, respectively, defined in extruder head 19 and lower die portion 24. Each of the insertable side members 31 and 32 further define a recess 37 which is shaped to provide a continuation of the extruder cavity C and orifice 30 as hereinafter more fully described.

The discharge orifice 30 and extruder cavity C are bounded at the ends thereof by walls 38 of side members 31 and 32. Walls 38 extend into projecting portions 39. Projecting portions 39 tend to define the width of plastic material which is extruded onto and between rolls 15 and 16 and act as a guide in positioning the extruder die with respect to the rolls 15 and 16.

It may be noted (FIG. 3) that the width of discharge orifice 30 is substantially greater than the width of the extruder cavity inlet orifice 20. Some materials, for example rubber or rubber-like materials, are quite viscous in a plastic state and exhibit a great resistance to being spread uniformly across an orifice opening which is considerably wider than the diameter of the inlet opening through which it is introduced into the extruder head.

If, by way of example, screw 18 were to discharge material directly onto and into the center of a pair of calender rolls, such as 15 and 16, the material would act quite differently at the effective edges of the orifice 17 defined by the rolls than at the center thereof in line with the extruder. It would be quite difficult and impractical to maintain the effective orifice defined by rolls 15 and 16 rectangular at the temperature of the material as it is issued from the extruder. Material at each edge of the effective orifice defined by the calender rolls would therefore assume different temperatures from that presented to the central portion of the orifice directly aligned with the screw. The net result of this effect is that the material passing through the calender rolls would have a varying temperature across its width and therefore the thickness and the surface quality of the material would vary and would be commercially unacceptable.

In accordance with the present invention, the extruder die between the screw and calender rolls is arranged to control the path of material introduced into extruder cavity C so that the material is so directed as to reach orifice 17 defined by the calender rolls at a reasonably uniform temperature and plasticity across the length thereof.

In accordance with the invention, extruder die 13 is designed to restrict a ready flow of material in a plastic state issuing from the screw into the center of the extruder cavity and impart a lateral directional component to material introduced into extruder cavity C. The extruder die is arranged to achieve a balance in temperature and plasticity in the material across the width thereof as it passes through the extruder discharge orifice 30 and is introduced into the orifice 17 defined by the calender rolls 15 and 16.

As was previously mentioned, the discharge orifice is of a shallow, generally inverted V shape. The central portion of the lower die portion 24 and lip 27 is raised with respect to the side portions of the cavity C as may best be seen in FIG. 2 wherein line 41 gives the profile of die portion 24 and lip 27 at the center thereof, and line 42 shows the contour of the lower die portion and side member 31. This shaping of the floor of the cavity restricts a ready flow of the material issued into the cavity by the screw 18 in the center of cavity C and imparts to the material issued into cavity C a directional component toward the side portions 31 and 32. The direction imparted to the material as it is issued into extruder cavity C is illustrated by arrows, FIG. 4. To further restrict the material centrally of the discharge orifice, the vertical dimension of the discharge orifice may be made smaller than the vertical dimension at the ends thereof as illustrated in FIG. 3. It will be noted that discharge orifice 30 tapers from the center thereof to a greater vertical dimension at the ends thereof.

It may thus be seen that, as material in a plastic state and of a high viscosity is issued into the extruder cavity C by screw 18, the shape and contour of the extruder 13 and the floor thereof is such that it will direct the material outwardly from the inlet orifice 20 of relatively small width toward the edges of a discharge orifice 30 of substantially greater width. In this manner material discharged through discharge orifice 30 will have a substantially uniform balance with respect to temperature and plasticity across the width of discharge orifice 30 and when the material reaches the calender orifice 17.

While it has been pointed out that the restricted center portion of the extruder die directs the material toward the outer edges of the orifice, the action of rolls 15 and 16 further aids in achieving a product having uniform characteristics. The surfaces of both rolls 15 and 16 are moving continuously and this movement acts to pull or draw the material from orifice 30. This action decreases the pressure which would otherwise be required to move the material out of the extruder die and into the roll nip. The width of the material drawn from orifice 30, due to the orifice contour, is essentially the same as the desired sheet. Thus, the calender rolls serve to refine the precise cross section of the sheet rather than to form it out of a conglomerate mass in the roll nip, as is the case in an ordinary calendering operation.

With the construction shown, the length of the extruder head 19 is substantially decreased. It is readily seen that the length of the extruder head 19 is made substantially less than its width. Therefore, feed screw 18 is not required to both feed the material and constrict it as is the case where the screw is required to force the material through a die to attain a desired width prior to calendering.

The invention is particularly adapted to processing heavy gauge stocks, such as one-half inch and above. At this thickness plastic material would ordinarily tend to flow through orifice 17, rather than be restrained by the rolls 15 and 16. However, orifice 30 restrains the direct flow of material from feed screw 18 and distributes the pressure uniformly across the roll face. The pressure of the material may thus be regulated by varying the shape of lower die lip 27, and the spacing between it and the rolls, as hereinafter described.

The pressure on the material as it is introduced into the extruder die is created by screw 18. Under optimum conditions, the material within the roller die will not only be of uniform temperature and viscosity but additionally will be of the same hydrostatic pressure. If these optimum conditions exist, then the calendering product emerging from the two rollers 15 and 16 will be found to be generally acceptable. Accordingly, a pressure transducer 43 is provided in each of side members 31 and 32 to provide a means for observing the pressure at the ends of the cavity. An additional pressure transducer 44 may be provided centrally of lip 27 for observing the pressure of the material at the center of the extruder. The readings of the transducers 43 and 44 may be compared to determine the consistency of the pressure of the material across the length of the discharge orifice 30 as it emerges therefrom.

A suitable pressure transducer is one of the type comprising a diaphragm which is contacted by the material and the diaphragm transmits a pressure to an enclosed fluid which actuates an indicating instrument calibrated in terms of pressure. If desired, suitable means could be provided for measuring the temperature at the center and sides of the discharge orifice. The characteristic(s) measured will, of course, depend upon the characteristic(s) which are to be controlled.

Further, in accordance with the invention, the extruder is arranged to have the sectional profile and contour of the extruder cavity and also the dimensions of the discharge orifice 30 varied across the width thereof dependent on the characteristics of a material passing therethrough. For example, when a material of relatively low viscosity is introduced into the extruder cavity, the material will have a greater propensity to flow outwardly toward the side members 31 and 32 and therefore it is not as necessary to provide as great a restriction in the center of the extruder cavity to direct the material issuing therein from the extruder screw 18 toward the side portions thereof.

Inasmuch as the material being processed may vary in viscosity, the lip 27 may be removed and replaced with another lip which would provide either a greater or lesser central restriction and difference in sectional profile tending to impart a directional component to the material toward the side walls 37. As previously explained, the lip 27 is removable from the recess provided therefor in lower die portion 24, and it may be removed and replaced with another lip which is shaped and contoured especially for a particular material dependent upon the viscosity thereof.

For the same reasons, the side members 31 and 32 are made removable and other side portions which are shaped to provide a discharge orifice of greater or lesser width may be inserted in the slots 35 and 36, previously described.

Figure 4:
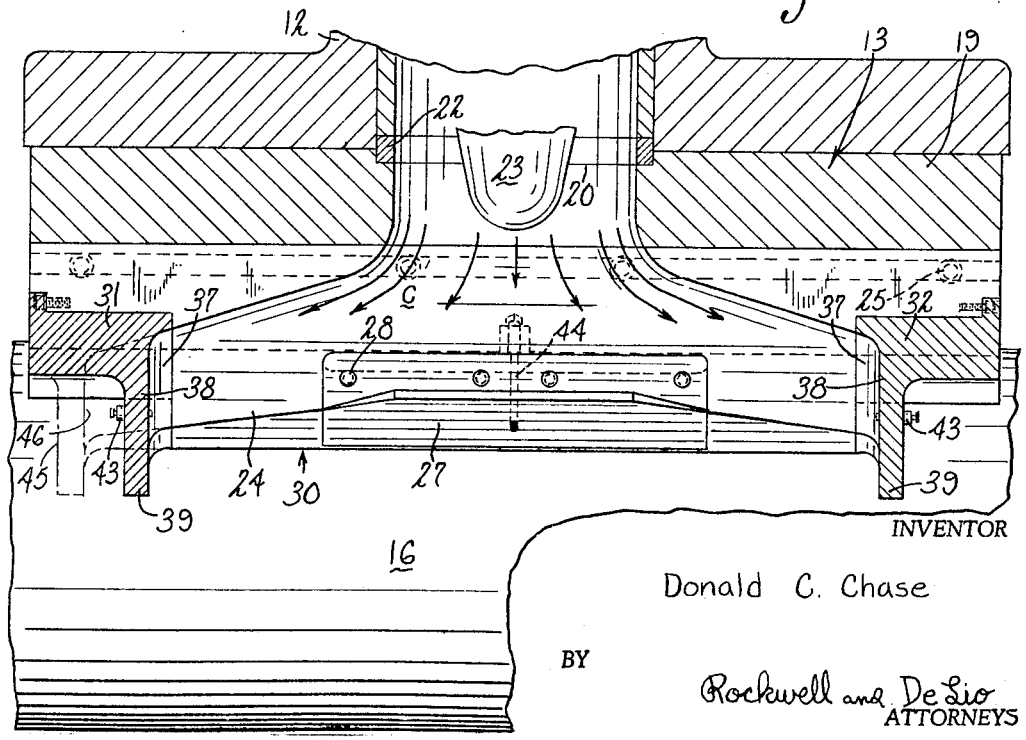
FIG. 4 is a sectional view seen along line 4—4 of FIG. 3.

By way of illustration, a side member 45 is illustrated in FIGS. 3 and 4 in proximity to side member 31 to show how the discharge orifice may be widened. The other side member, as represented by side member 45, would be of substantially the same overall dimension as the side pieces 31 and 32, but so designed with a recess 46 as a continuation of the cavity defined by extruder head 19 and lower die portion 24 as to provide a greater width of the discharge orifice 30. The purpose of the removable and interchangeable die side members 31 and 32 is to provide a means for varying the width of the material issuing through the discharge orifice 30 and presented to the orifice 17 defined by the calender rolls 15 and 16. It is important to understand that this does not necessarily mean that the width of the calendered product is the same as the width of the discharge orifice. It is well known that certain materials have a tendency, due to the low viscosity thereof, to spread more than other materials as they pass through calender rolls. The variable side portions 31 and 32 provide a means to alter the width of the discharge orifice 30 in accordance with the characteristics of varying materials and thereby control, to a degree, the ultimate width of the product calendered through rolls 15 and 16. The side members 31 and 32 are removably secured to extruder head 19 and lower die portion 24 by means of bolts 47 and 48, respectively.

The enlarged orifice 30 in extruder head 19 provides an additional advantage, in that it facilitates cleaning of cavity C. For example, orifice 30 as shown in FIG. 3 may be three inches or more in height. Roller die 10 is movable on rails R away from extruder head 19 to allow access thereto. The feature of making the roller-die movable with respect to extruder portion 14 allows further control over the material being processed by adjustment of the clearance between discharge orifice 30 and the rolls.

It will be understood that the discharge orifice 30 in extruder head 19 need not be of the inverted V shape shown, but may be substantially horizontal or in the shape of a generally upright V. The critical feature is that the center portion be restricted with respect to the sides of the orifice to direct the material issuing from housing 12 outwardly toward the sides of orifice 30.

While a preferred embodiment of the invention has been illustrated and described for purposes of disclosure, modifications to the disclosed embodiment of the invention as well as other embodiments thereof may occur to those skilled in the art which do not depart from the spirit and scope of the invention. Accordingly, the appended claims are intended to cover all embodiments of the invention which do not depart from the spirit and scope of the invention.

What is claimed is:
1. An extruder-roller die comprising an extruder head defining an extruder die cavity therethrough between a discharge orifice and an inlet orifice adapted to receive material forced therein in a plastic state, a pair of cooperating rolls defining a nip therebetween, said extruder head and said discharge orifice being arranged to introduce the material onto said rolls adjacent the nip thereof for forming said material by said nip, said discharge orifice being of substantially greater horizontal and lesser vertical dimension than said inlet orifice, the vertical dimension of the discharge orifice at the center thereof being lesser than the vertical dimension of the discharge orifice at the ends thereof so that material introduced into the cavity through said inlet orifice is uniformly spread along the width of the cavity and material is discharged from said discharge orifice on to said rolls with substantially uniform characteristics, and said rolls act to pull material through said cavity and discharge orifice to said nip.

2. The apparatus of claim 1 wherein said extruder head is so positioned with respect to said rolls that the material from the discharge orifice is discharged onto only one of said rolls.

3. The apparatus of claim 1 wherein said extruder head has a recess defined therein centrally adjacent said discharge opening, a removable lip member received within said recess, said lip member cooperating with the walls defining said cavity and providing an uninterrupted continuation of said walls to define said discharge orifice and the wall of said cavity, the surface of said lip member within the cavity defining a substantial portion of one wall thereof and the vertical dimension of said discharge orifice centrally thereof.

4. The apparatus of claim 1 wherein said extruder head is arranged to receive at the sides thereof removable side members, said side members defining recesses therein, communicating with the cavity and the upper and lower edges thereof defining said discharge orifice to provide lateral continuations of said cavity and said discharge orifice and thereby determine the overall width of said discharge orifice.

5. The apparatus of claim 1 further including means for measuring the pressure of material in said cavity at the sides and centrally of said discharge orifice.

6. The apparatus of claim 1 further including means for moving said rolls toward and away from said discharge orifice.

7. An extruder-roller die comprising an extruder head defining an extruding cavity therethrough having a discharge orifice, an inlet orifice adapted to receive material forced therein in a plastic state, said extruder head and said discharge orifice being arranged to introduce the material to the nip of a pair of cooperating rolls, said discharge orifice being of substantially greater horizontal and lesser vertical dimension than said inlet orifice, the walls of the cavity tapering outwardly from said inlet orifice to said discharge orifice, the walls defining said cavity being so shaped that the central portion of said discharge orifice is restricted with respect to the sides thereof so that material forced into the cavity has imparted thereto a lateral directional component tending to spread material substantially uniformly along the width of the cavity, whereby material is discharged from said discharge orifice with substantially uniform characteristics along the width thereof.

8. The extruder head of claim 7 wherein said discharge orifice is of a generally shallow V-shape.

References Cited by the Examiner

UNITED STATES PATENTS

| | | | |
|---|---|---|---|
| 790,918 | 5/1905 | DuPont | 18—12 |
| 1,717,620 | 6/1929 | Page. | |
| 1,919,361 | 7/1933 | Farrington | 18—12 |
| 2,091,125 | 8/1937 | Stewart | 18—12 |
| 2,514,211 | 7/1950 | Carlson | 18—12 |
| 2,567,704 | 9/1951 | Grimes | 18—12 |
| 2,859,475 | 11/1958 | Tomberg | 18—12 |

FOREIGN PATENTS

B 25,134X139a 9/1956 Germany.

WILLIAM J. STEPHENSON, *Primary Examiner.*

L. S. SQUIRES, *Assistant Examiner.*